(12) United States Patent
Oddo

(10) Patent No.: US 7,222,090 B2
(45) Date of Patent: May 22, 2007

(54) METHOD AND SYSTEM FOR PARSING PURCHASE INFORMATION FROM WEB PAGES

(75) Inventor: Anthony Scott Oddo, Jamaica Plain, MA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 953 days.

(21) Appl. No.: 10/136,537

(22) Filed: May 1, 2002

(65) Prior Publication Data

US 2003/0105681 A1   Jun. 5, 2003

Related U.S. Application Data

(60) Provisional application No. 60/315,835, filed on Aug. 29, 2001.

(51) Int. Cl.
  G06Q 30/00   (2006.01)
  G06F 7/00    (2006.01)
  G06F 17/30   (2006.01)
(52) U.S. Cl. .............................. 705/26; 705/27; 707/3; 707/6
(58) Field of Classification Search .................. 705/26, 705/27; 707/3, 6
  See application file for complete search history.

(56) References Cited

U.S. PATENT DOCUMENTS

| | | | | |
|---|---|---|---|---|
| 6,052,710 | A   |  4/2000 | Saliba et al. | 709/203 |
| 6,078,914 | A * |  6/2000 | Redfern | 707/3 |
| 6,131,150 | A * | 10/2000 | DeTreville | 711/173 |
| 6,418,441 | B1  |  7/2002 | Call | 707/10 |
| 6,578,030 | B1 * |  6/2003 | Wilmsen et al. | 707/3 |
| 6,938,000 | B2 * |  8/2005 | Joseph et al. | 705/26 |
| 7,107,226 | B1 * |  9/2006 | Cassidy et al. | 705/26 |
| 7,127,416 | B1 * | 10/2006 | Tenorio | 705/26 |
| 2002/0016741 | A1 * | 2/2002 | Black et al. | 705/26 |

(Continued)

FOREIGN PATENT DOCUMENTS

WO   WO-9837499 A1 * 8/1998

OTHER PUBLICATIONS

Anon., "TAXI INTERACTIVE: mySimon and Taxi Pair Desktop Shopping Application Web Shopping Service," M2 Presswire, Jan. 12, 1999.*

(Continued)

*Primary Examiner*—Nicholas D. Rosen
(74) *Attorney, Agent, or Firm*—Patterson & Sheridan, LLP

(57) ABSTRACT

A method for parsing purchase information from code in a Web page. The method includes detecting at least one known product keyword and at least one product data string following that product keyword and being associated with that product keyword. The product data string can be a descriptor for the product keyword for one product in the purchase. The method also includes detecting at least one known transaction keyword and at least one transaction data string following that transaction keyword and being associated with that transaction keyword, the transaction data string being a descriptor for the transaction keyword. The data type of the descriptors can be checked to determine if they are of the same type as the corresponding product or transaction keyword. These processes can be repeated for all of the data strings in the HTML page, and this detected purchase information can be placed into an organized form.

16 Claims, 4 Drawing Sheets

U.S. PATENT DOCUMENTS

| | | | |
|---|---|---|---|
| 2002/0026371 A1* | 2/2002 | Kishi | 705/26 |
| 2002/0154162 A1* | 10/2002 | Bhatia et al. | 345/745 |
| 2005/0060162 A1* | 3/2005 | Mohit et al. | 705/1 |
| 2006/0242128 A1* | 10/2006 | Goel | 707/3 |
| 2006/0265363 A1* | 11/2006 | Calvignac et al. | 707/3 |

OTHER PUBLICATIONS

Guan, T., et al., "KPS: A WEb Inforamtion Mining Algorithm," Computer Networks, vol. 31, No. 11-16, pp. 1495-1507, May 17, 1999.*

Mirabella, L., "Cyberspace Mall Start-up Asks Developers to Join in; In Appeal to Foes, Mall.com Also Says Retailers Can Profit," Baltimore Sun, p.1C, May 28, 1999.*

Anon., "B2BWorks Announces Partnership with InfoXpress.com," Business Wire, p. 1284, Jan. 20, 2000.*

Xiao, L. et al., "Information Extraction from HTML:Combining XML and Standard Techniques for IE from the Web," Proceedings of the 14th International Conference on Industrial and Engineering Applications of Artificial Intelligence and Expert Systems, IEA/AIE 2001, Proceedings (Lecture Notes in Artificial Intelligence, vol. 2070), pp. 165-174.*

* cited by examiner

| | | | | |
|---|---|---|---|---|
| ProductName | 1 | | ExtendedPrice | 6 |
| Name | 1 | | TotalPrice | 6 |
| ItemName | 1 | | OrderPrice | 6 |
| itemname | 1 | | ItemTotal | 6 |
| Product | 1 | | Total | 6 |
| SUMMARY | 1 | | total | 6 |
| Title/Author | 1 | | TOTAL | 6 |
| Description | 2 | | ShipMethod | 15 |
| ItemDescription | 2 | | ExpressShip | 20 |
| ProductDescription | 2 | | store | 20 |
| ITEM | 2 | | ShipDate | 20 |
| Item | 3 | | Tracking # | 20 |
| Item # | 3 | | ShippingAddress | 20 |
| SKU | 3 | | Regular | 20 |
| ProductID | 3 | | GiftWrap | 20 |
| PRICE | 4 | | TotalPublisher'sPrice | 20 |
| Price | 4 | | YouSave | 20 |
| Price* | 4 | | Options | 20 |
| TotalClubPrice | 4 | | Status | 20 |
| UnitPrice | 4 | | Attributes | 20 |
| UNITCOST | 4 | | Availability | 20 |
| ConfiguredPrice | 4 | | Style/Size | 20 |
| Each | 4 | | Platform | 20 |
| each | 4 | | Color | 20 |
| Adjusted | 4 | | color | 20 |
| PriceEach | 4 | | SIZE | 20 |
| PricePerUnit | 4 | | Size | 20 |
| Price/Unit | 4 | | size | 20 |
| Today's Price | 4 | | | |
| Qty. | 5 | | | |
| Qty | 5 | | | |
| QTY | 5 | | | |
| Quantity | 5 | | | |
| quantity | 5 | | | |

FIG. 3

| | |
|---|---|
| ProductTotal: | 11 |
| OrderSubtotal: | 11 |
| ProductSubtotal | 11 |
| Subtotal: | 11 |
| Subtotal | 11 |
| SUBTOTAL | 11 |
| SubTotal: | 11 |
| subtotal: | 11 |
| Tax: | 12 |
| TAX: | 12 |
| *Tax | 12 |
| Tax(AZonly): | 12 |
| *Estimated Tax | 12 |
| estimatedsalestax: | 12 |
| Taxes | 12 |
| Taxes: | 12 |
| SalesTax: | 12 |
| SalesTax | 12 |
| ShipMethod | 15 |
| DeliveryMethod: | 15 |
| ShippingType: | 15 |
| ShippingMethod: | 15 |
| SHIPPINGMETHOD: | 15 |
| Shippin(via StandardShipping) | 16 |
| Shipping(Ground) | 16 |
| EstimatedShipping | 16 |
| *EstimatedDelivery | 16 |
| Shipping | 16 |
| Shipping: | 16 |
| standardshipping&handling: | 16 |
| Shipping&handling | 16 |
| StandardShipping-ContinentalUS(10-14 businessdays)-Shipping: | 16 |
| StandardShipping: | 16 |
| ShippingTotal: | 16 |

| | |
|---|---|
| Discounts: | 13 |
| Discount: | 13 |
| DiscountTotal: | 13 |
| 1stPurchaseDiscount FirstPurchaseOnly. Notvalidwithotheroffers. | 13 |
| CartTotal: | 14 |
| Total: | 14 |
| TOTAL | 14 |
| TOTAL: | 14 |
| GrandTotal: | 14 |
| estimatedtotal: | 14 |
| *EstimatedTotal | 14 |
| TotalCostofOrder: | 14 |
| OrderTotal | 14 |
| OrderTotal(USD$): | 14 |
| OrderTotal: | 14 |
| ORDERTOTAL: | 14 |
| CreditCardType: | 17 |
| PaymentMethod: | 17 |
| PaymentInformation: | 17 |
| Handling | 18 |
| GiftCertificateTotal: | 20 |
| Monogram/GiftWrap | 20 |
| Credits: | 20 |
| GlobalReleaf | 20 |
| ShippingTax: | 20 |
| ShippingOption: | 20 |
| ShippingTotal: | 20 |

FIG. 4

METHOD AND SYSTEM FOR PARSING PURCHASE INFORMATION FROM WEB PAGES

FIELD

The present invention relates generally to methods and systems for parsing purchase information from a Web page without the need for specific knowledge about the structure of the Web page.

BACKGROUND

Applications that require or benefit from the capture of purchase information from Web pages have been developed in a number of areas. Some applications, for instance, aggregate purchase information from a number of different Web sites for a given consumer. Other applications gather purchase information from a given consumer's purchases over the Internet in order to build a profile of the consumer, which can be used for targeted advertising based on the user's profile.

The accuracy of information parsed from Web pages can be important in order to provide useful information about the consumer. Some methods and systems for parsing purchase information that are currently used are specifically tailored for each Web site from which purchase information will be parsed. These parsing systems and methods, therefore, will have a number of templates for parsing Web pages, with each template being designed for one specific Web page. This results in problems if the Web site to be parsed changes or if it is desired to use the method for other Web sites. In addition, it is common for parsing systems and methods to identify these Web pages to be parsed by specific Uniform Resource Locator (URL) information. A URL identifies a network path to a specific Web site. If this URL information changes, these parsing systems and methods might not work.

A need exists for a method and system for parsing purchase information from a Web page without the need for specific knowledge about the structure of the Web page.

SUMMARY

The present invention is directed to a method and system for parsing purchase information from a Web page. This purchase information can include product information, such as the product name, description, and price, as well as transaction information, which can include any information about the total purchase, such as the credit card used for the purchase, the total cost of all products purchased, and the type of shipping selected. In one embodiment, the system includes a sniffer to detect Web pages with purchase information and a parser to parse the purchase information from the HTML Web pages. The parser can contain instructions for parsing according to the method described below for parsing.

In one embodiment, the method includes detecting at least one known product keyword and at least one product data string following that product keyword and being associated with that product keyword. The product data string can be a descriptor for the product keyword for one product in the purchase. The method also includes detecting at Least one known transaction keyword and at least one transaction data string following that transaction keyword and being associated with that transaction keyword, the transaction data string being a descriptor for the transaction keyword. The data type of the descriptors can be checked to determine if they are of the same type as the corresponding product or transaction keyword. These processes can be repeated for all of the data strings in the HTML page, and this detected purchase information can be placed into an organized form. Another aspect of the invention can include a computer readable medium incorporating instructions to perform this method.

Purchase information can be parsed from, for example, confirmation and checkout pages from on-line shopping Web sites. In one embodiment, the method and system parse purchase information from Web pages in a way that does not require specific knowledge of the Web site, such as the templates used by the Web pages, and in a way that is impervious to changes in the structure or content of the Web site.

BRIEF DESCRIPTION OF THE DRAWINGS

For a fuller understanding of the nature and objects of the present invention, reference should be made to the following detailed description taken in connection with the accompanying drawings wherein:

FIG. 3 is list of product keywords that can be used in one embodiment.

FIG. 4 is list of transaction keywords that can be used in one embodiment.

DETAILED DESCRIPTION

The present invention is directed to a method and system for parsing purchase information from a Web page. Such purchase information can be parsed from, for example, confirmation and checkout pages from on-line shopping Web sites. In one embodiment, the method and system parse purchase information from Web pages in a way that does not require specific knowledge of the Web site, such as the templates used by the Web pages, and in a way that is impervious to changes in the structure or content of the Web site. The system and method described herein do this by taking into account the structure of purchase information, the limited number of English words used to describe purchases, and the structure of HTML Web pages.

The purchase information that is parsed from Web pages can be used in a variety of ways. In one embodiment, the parsed information can be used to develop a profile of a computer user. For example, if parsed information indicates that a client buys a large number of books, relevant information can be added to the user's profile indicating an affinity for books and literature. Targeted advertising could then be used to advertise literature or books to that user. It should be noted, however, that the present invention is not limited to the building of such profiles. Instead, the method and system for parsing purchase information can be used to gather purchase information that can be used in a variety of ways.

Figure 1:
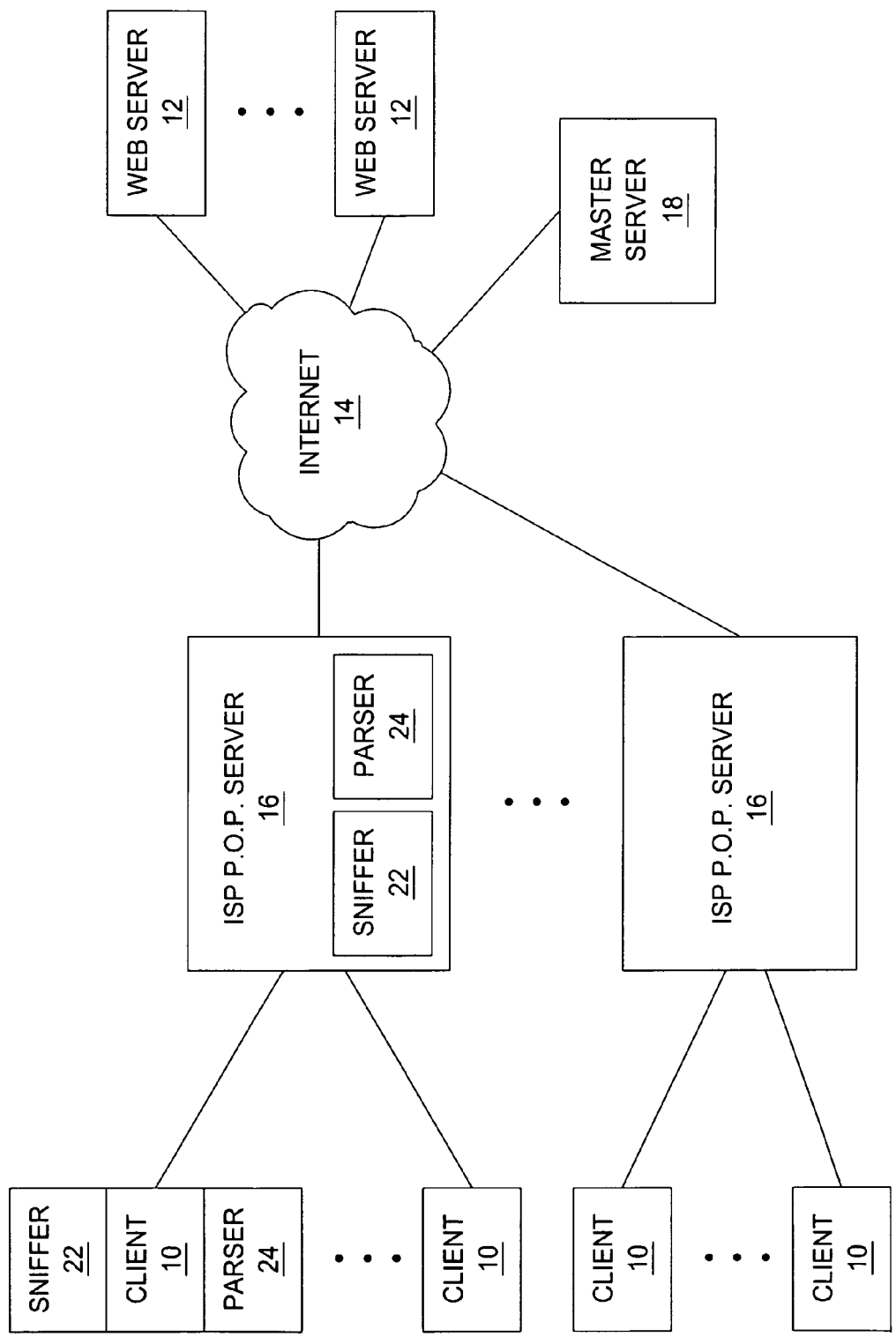
FIG. 1 is a block diagram illustrating a representative network in which the inventive system may be implemented.

FIG. 1 illustrates a representative network in which the inventive system may be implemented in one embodiment. The network includes one or more client machines 10 operated by various individual users. The client machines 10 connect to multiple servers 12 via a communication channel 14, which can be the Internet. It may, however, alternatively be an Intranet or other connection. In the case of the Internet, the servers 12 are Web servers that are selectively accessible by various clients. The Web servers 12 operate so-called "Web sites" and support files in the form of documents and pages. A network path to a Web site generated by the server is identified by a Uniform Resource Locator (URL).

One example of a client machine 10 is a personal computer such as a Pentium-based desktop or notebook computer running the Windows operating system. A representative computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen and pressing on the mouse buttons to perform a user command or selection. Also, one or more "windows" may be opened up on the screen independently or concurrently as desired. The content delivered by the system to users is displayed on the screen. Other types of client devices are also possible such as mobile Internet devices (e.g., Web-connected cellular phones and personal digital assistants).

Client machines 10 typically include browsers, which are known software tools used to access the servers 12 of the network. Representative browsers include Netscape Navigator and Microsoft Internet Explorer, although other browsers may be used within the scope of the embodiments described herein. Client machines 10 usually access servers 12 through some private Internet service provider (ISP) such as, e.g., American Online. Illustrated in FIG. 1 are multiple ISP "point-of-presence" (POP) systems, each of which includes an ISP POP server 16 linked to a group of client machines 10 for providing access to the Internet. Each POP server 16 is connected to a section of the ISP POP local area network (LAN) that contains the user-to-internet traffic. The ISP POP server 16 can capture URL page requests from individual client machines 10 for use in user profiling (if user profiling is based on Web surfing habits of users) and also to distribute targeted content to users. FIG. 1 also depicts a master server 18. In one embodiment, this master server 18 can be a server that is used to gather and store purchase information that is parsed from HTML Web pages.

As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a client machine 10 having an HTML-compatible browser (e.g., Netscape Navigator) can retrieve a Web page (namely, an HTML formatted document) of a Web site by specifying a link via the URL (e.g., www dot yahoo dot com slash photography). Upon such specification, the client machine 10 makes a transmission control protocol/Internet protocol (TCP/IP) request to the server identified in the link and receives the Web page in return.

In one embodiment, the data collection component that detects the purchase information can be a sniffer 22 that monitors client interactions with the WWW. Once purchase information is detected, a parser 24 can be used to parse purchase information from an HTML Web page. The sniffer 22 and parser 24 can exist within the client machine 10, the ISP P.O.P. Server 16, or within the master server 18.

In the embodiment depicted in FIG. 1, the sniffer 22 and parser 24 exist within the ISP P.O.P. Server 16. FIG. 1 depicts a sniffer 22 and parser 24 in one of the ISP servers 16, although a sniffer 22 and parser 24 could exist within each ISP server 16. In this embodiment, the sniffer 22 accesses the HTML Web pages in transit to or from the client machine 10, and the parser 24 parses purchase data from those Web pages. To detect purchase information, the sniffer 22 looks for any secure Web pages that contain purchase information. The purchase information is found by using keyword searches or text searches of secure Web pages to find any of a plurality of keywords or data strings, as described below, that are known purchase keywords or that fit certain requirements. In this manner, the sniffer 22 and parser 24 need not know the specific URL information for Web pages to be parsed. Instead, the Web pages with purchase information are located by keyword searches of all secure Web pages, thus allowing the method and system to parse without searching for specific URL information that might change over time.

Purchase data that is parsed at the ISP P.O.P. Server 16 can then be delivered to master server 18 for storage and for use in developing profiles for users. This sniffer 22 may generally detect and store the user's program or URL requests and detect if purchase information is present, and the parser 24 can store the user's purchase information. Because multiple clients 10 may be connected to the ISP server 16 in this embodiment, the user's IP address may be stored in a correlation database. Because IP addresses are typically assigned dynamically, they are not necessarily the same every time a client 10 logs into the ISP. To correlate an IP address with the associated client 10, the data collection component queries an IP address to an anonymous user ID (AID) cross-reference table stored in another database at the ISP server 16. It then stores the User ID and URL/program information in the correlation database.

If the sniffer 22 and parser 24 exist within the client machine 10, which is also shown in FIG. 1 for one of the clients 10, the sniffer 22 and parser 24 can extract purchase information as it comes into the client machine 10 or as it exits the client machine 10. In general, the sniffer 22 and parser 24 can function at the client level in the same manner as if the sniffer 22 and parser 24 exist at the server level. If the sniffer 22 and parser 24 exist at the client level, the parser 24 may periodically send back to the master server 18 parsed information. In still other embodiments, the sniffer 22 and parser 24 exist at both the client level and at the server level.

In still other embodiments, the sniffer 22 and parser 24 exist within the master server 18. It should be noted that in this embodiment, the sniffer 22 might need access to passwords of the user in order to access HTML Web pages containing purchase information so that parsing of purchase information can be accomplished. The sniffer 22 and parser 24 can, in this embodiment, function in a manner similar to that if the sniffer 22 and parser 24 exist within the ISP server 16.

In order to detect Web pages containing purchase information, the sniffer 22 can monitor interactions and search for purchase data and keywords that indicate the presence of purchase information. In other embodiments, the sniffer 22 may monitor URL information and search for keywords in the URL information that indicates that a Web page contains purchase data. If the Web pages do contain such purchase information, parsing can be accomplished. Regardless of the location of the sniffer 22 and the parser 24, the parser 24 can parse purchase information from HTML Web pages in the manner described above and in more detail below.

HTML defines the structure and layout of a Web page by using a variety of tags and attributes. The structure of an HTML page, for instance, begins with "<HTML><HEAD> (header information)</HEAD><BODY>" and ends with "</BODY></HTML>." The information that appears in the Web page fits between the <BODY> and </BODY> tags. HTML uses a large variety of tags to specify information about the Web Page. The tag "<B>" starts making text in the Web page bold, and the tag "</B>" stops making the text bold. Similarly, the tag "<I>" begins making text appear in italics, and the tag "</I>" stops making the text appear in italics. Generally, a <TAG> tells the HTML browser to do something, and an attribute goes between two tags to tell the HTML browser how to do something. The tag < BR> tells the HTML browser to start a new line.

A number of special characters are also used in HTML syntax for specific instructions to the HTML browser. These special instructions begin with an "&" and end with a ";", with the letters between the "&" and the ";" acting as an abbreviation for the instructions. The special character " ", for instance, indicates a non-breaking space in the text, and the special character """ indicates a quotation mark ("). There are, of course, many tags, special characters, and other information that make up the HTML language, and the examples above are just a few examples of the HTML syntax. Some tags indicate the alignment of text on a Web page others indicate the color of the Web page.

The method and system leverage the fact that any text that appears on a Web page exists between a right bracket ">" and a left bracket "<" in HTML. Information about the structure of the page appears between a left bracket "<" and a right bracket ">". As an example, HTML language for a typical Web page could be:

<td         colspan=2         align=right         nowrap valign=top><b>Company:</b>

The first part of this syntax, "<td colspan=2 align=right nowrap valign=top>", is HTML syntax that describes the structure of a section of the page, such as alignment information. This first part starts with a left bracket "<" and ends with a right bracket ">". The second part of the example, "<b>Company:</b>", contains text that will appear on the Web page in boldface type. The actual text, "Company:", occurs between a right bracket ">" and a left bracket "<" in the HTML syntax; e.g., ">Company:<".

Because all of the keywords associated with a purchase and all of the information related to a purchase appear as text on a confirmation page of an on-line purchase, the method and system begin by looking at all text strings occurring between a right bracket ">" and a left bracket "<" as potential pieces of purchase information.

HTML syntax uses certain tags to separate data in tables. For instance, the "<BR>" tag is used for line breaks, the "<P>" tag is used to start a paragraph, and the "<TD>" tag is used to separate data in a table. Rows of data in a table are indicated by the "<TR>" tag. Other tags are used to denote aesthetic changes to the typeface that can be used for emphasis. For example, such tags can include "<B>" for bold face, "<I>" for italics, and "<U>" for underlining.

To increase efficiency during parsing, aesthetic tags, such as <B>, <I>, and <U> can first be removed. Removing such strings increases the chance that the remaining text is potentially of interest.

A second piece of knowledge used by the method and system relates to the structure of purchase information. Purchase information can be broken into two types of data: product information and transaction information. Through-out this specification, the term "product information" will be used to refer to all information related to a product, such as the product name, description, item number, quantity, unit price, and total price. The term "transaction information" will be used to refer to any information that is not specifically related to an individual product, but is instead related to the overall purchase or multiple product purchases. For example, transaction information for a transaction can include subtotal, tax, shipping cost, and total cost information, as well as discount information, shipping type, and credit card type. The transaction information for subtotal, tax, shipping cost, discounts, and total cost are called transaction prices, and the transaction information for shipping type and credit card type are called transaction types.

A further piece of structural knowledge that can be useful is that product information is frequently in a table format within a Web page, and transaction information may or may not be in a table. Furthermore, product information usually occurs before transaction information, with the exception of credit card and shipping type information. In addition, the order total for a purchase is usually the last piece of transaction information in an HTML Web page other than the credit card type.

In one embodiment, to detect the presence of data in a table format, one could look for <TABLE>, </TABLE> tags in the HTML. Some Web pages, however, have different structures with tables embedded in tables that can lead to errors if data in table format is detected using the HTML tags for tables. The method and system, therefore, relies on other information to determine the presence of product and transaction information. In particular, in one embodiment, product and transaction keywords are used to determine whether or not a product or transaction table is present.

There are certain "keywords" that are commonly used on confirmation and checkout pages of Web sites for certain types of information. The term "keyword" will be used throughout this specification to refer to a known word that is commonly used on a Web page to indicate the presence of a certain type of data. Certain keywords are known for product information and certain keywords are known for transaction information. Keyword types are a general category of keywords that fall within the same classification. For example, the keyword type "Quantity" could be indicated by one of the following keywords: Quantity, Qty, QTY, Quantity, and quantity. Some common keywords types for product information are depicted in Table 1 below. Each keyword has one or more corresponding descriptors that define the product that the consumer buys. For instance, a product keyword can be "Description," and a corresponding descriptor for this keyword can be "Winter Jacket," which is a text string of data. These pieces of data that are not keywords, but are instead data that specify information about the product, and are referred to as "descriptors" throughout this specification. Each descriptor is of the same data type as the corresponding keyword. For instance, in Table 1 below, the data type for the keyword "Description" is a text string. Table 1 below indicates common product keywords and data types.

TABLE 1

Product Keywords

| Keyword Types | Data Type |
|---|---|
| Product Name | Text |
| Description | Text |

TABLE 1-continued

Product Keywords

| Keyword Types | Data Type |
|---|---|
| Item Number | Integer |
| Unit Price | Real number |
| Quantity | Integer |
| Total Price | Real number |

FIG. 3 is a more detailed list of product keywords. In FIG. 3, each keyword in the left-hand column that is of the same keyword type has the same number in the right-hand column. For instance, the ProductName, Name, ItemName, itemname, Product, SUMMARY, and Title/Author each have product keyword type "1," indicating that they are of the same keyword type.

Keyword types for transaction information are depicted in Table 2 below. Again, each transaction keyword type has one or more corresponding descriptors that define the transaction. For instance, a transaction keyword can be "Subtotal," and a corresponding descriptor for this keyword can be "$33.99," which is a real number. Table 2 below indicates common transaction keyword types and data types.

TABLE 2

Transaction Keywords

| Keyword Type | Data Type |
|---|---|
| Product Total | Real number |
| Subtotal | Real number |
| Tax | Real number |
| Discounts | Real number |
| Total | Real number |
| Shipping Type | Text |
| Shipping Cost | Real number |
| Credit Card Type | Text |
| Other | Any data type |

FIG. 4 is a more detailed list of transaction keywords. In FIG. 4, each keyword in the left-hand column that is of the same keyword type has the same number in the right-hand column. For instance, the ProductTotal:, OrderSubtotal, ProductSubtotal, Subtotal:, Subtotal, SUBTOTAL, SubTotal, and subtotal each have transaction keyword type "11," indicating that they are of the same keyword type.

First Embodiment

Figure 2:
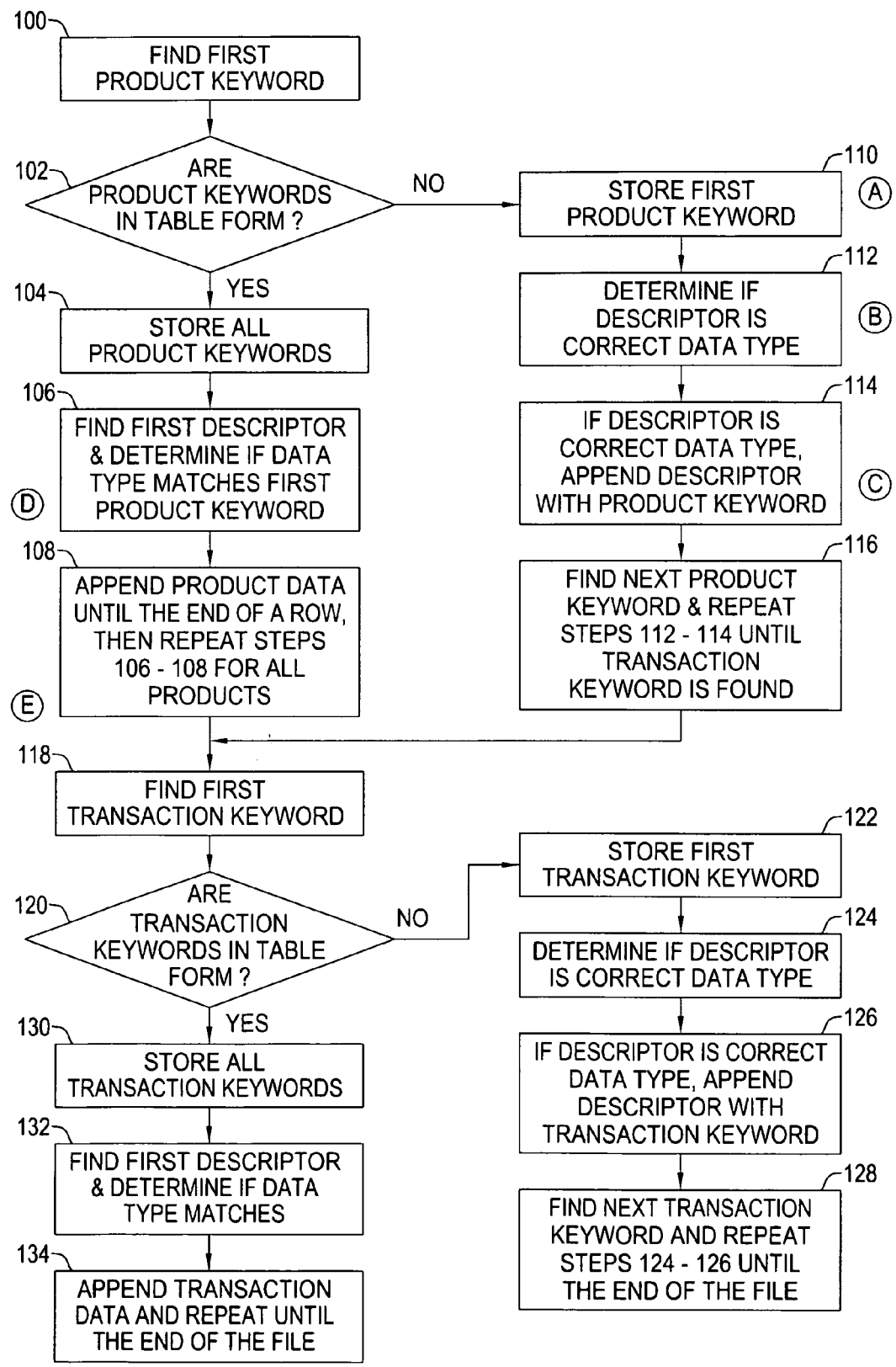
FIG. 2 is a block diagram of a flow chart of one embodiment for parsing purchase information.

FIG. 2 depicts a flow diagram of the method in a first embodiment. Instructions to perform the method depicted in FIG. 2 and described throughout this specification can exist within the sniffer 22 and parser 24, which can be located on the client machine 10, the ISP server 16, or the master server 18.

Block 100 depicts the parsing of strings of text from HTML syntax and checking to determine if each string is a keyword. If a string is a product keyword, the method continues to look for other product keywords and keeps track of how many consecutive product keywords are found. Product information in a table is typically indicated by the presence of four or more product keywords in a row. If there are four or more product keywords in a row, therefore, product information arranged in a table has been found. If four or more consecutive product keywords are not found, then product information in the form of a table has not been found. Block 102 of FIG. 2 indicates the determination of whether product information is in table form or not.

After four or more consecutive product keywords have been found, block 104 in FIG. 2 is performed. In block 104, the product keywords are stored. Table 4 below illustrates one method that can be used to store the product keywords. In Table 4, which will be described in greater detail below, the product keywords form the first row in a table that can be saved to store the product information. Each product keyword in Table 4 forms a column header. Table 4, for instance, has five column headers (keywords): Product Name, Description, Item Number, Unit Price, and Quantity.

In block 106 of FIG. 2, the first data string that is not a product keyword will be the first piece of the first row of product data. These pieces of data that are not keywords, but are instead data that specify information about the product, and are referred to as "descriptors," as noted above. This piece of data is checked to see if it is the same data type as the keyword for its column. For example, if the first column (keyword) is "Qty," or "Quantity," the data type for quantity is an integer. The parser 24, therefore, will check the first descriptor to ensure that the descriptor is an integer. If the column (keyword) is "Price," the data string should contain a In addition, a data string for "Price" can be checked, in one embodiment, to ensure that the third character from the end is a decimal point. The price "$9.99," for instance, contains a decimal as the third from the last character. The method, therefore, counts the descriptors as they are found and matches them up with the keywords that were found earlier and that form the columns of a table in the HTML page. These descriptors are then stored under the appropriate keyword. Referring again to Table 4, the first product contains the Product Name "Nike T-shirt," the Description "Red Shirt," the Item Number "134455," the Unit Price "$22.99," and the Quantity "1." This information forms a product row in Table 4.

The method repeats this process of matching descriptors with product keywords until all of the product information has been parsed from the HTML page, as indicated by block 108 of FIG. 2. All of the product information has been parsed when a transaction keyword is found or when a descriptor does not match the column type that it corresponds with. If a descriptor does not match the data type for the product keyword (the column type), the information is not in the form of a table, and parsing can be performed in a different manner.

When parsing descriptors using the inventive method, a different procedure can be used from when keywords are parsed. Keywords, even if made from multi-word phrases, such as "Order Total," always occur between one right bracket ">" and one left bracket "<". An example of this type of keyword in HTML syntax is ">Order Total:<". Descriptors, on the other hand, may extend across several sets of brackets. For instance, the descriptor "<b>Nike<b>T-shirt</td>" extends beyond one set of brackets and indicates the term "Nike T-shirt" as a single descriptor. When potential keywords are parsed, therefore, any data strings occurring between a right bracket ">" and a left bracket "<" will be taken and appended together to form a single descriptor. When descriptors are being parsed, on the other hand, the data strings that occur between a right bracket ">" and a left bracket "<" are appended together with any data strings occurring between the next set of right ">" and left brackets "<" until the end of a piece of data is reached, and all of these appended data strings form a single descriptor. The end of a piece of data in HTML is usually indicated by a </td>tag. As an example, the HTML syntax "<b>Nike<b>T-shirt</td>" is a single descriptor that contains two data strings between right ">" and left "<" brackets. These data strings are appended together into a single descriptor until the "</td>" tag is reached.

The parser 24 therefore fills in the descriptors for each product purchased in a row under the appropriate column headers (such as in Table 4), which are indicated by the product keywords. When the end of a purchase row is reached, as typically indicated by a "</td>" tag in HTML (to indicate the end of a piece of data) and the last column header (keyword) in a stored table, the next data string could be the first column of the next product data row or it could be the first transaction keyword. In this case, the method and system will append all of the data strings that occur between the first right bracket ">" and first left bracket "<", and then check to see if this string is a transaction keyword. If it is not a transaction keyword, then the method and system treats this data string as the first descriptor for a product, and the parser 24 continues to append data strings into the next product data row until the end of the product row is reached, which is typically indicated by the last column header (keyword) in a stored table. This process is therefore continued until a transaction keyword is reached, which indicates the end of the product information for the purchase.

Table 3 below lists HTML syntax for product information that is in the form of a table:

TABLE 3

Product Information In Table Form

<TR><TD bgColor=white vAlign=top><BR>&nbsp;<B>Product Name:&nbsp;</B></TD><TD><BR>&nbsp;<B>Description:</B></TD> <TD><BR>&nbsp;<B>Item: </B></TD><TD><BR>&nbsp;<B>Unit Price:</B></TD><TD><BR>&nbsp;<B>Quantity:&nbsp;</B> :&nbsp; </B></TD></TR> <TD align=right bgColor=white vAlign=top><BR> &nbsp;<TR><b>Nike<b>T-shirt</td><TD>&nbsp;&nbsp;<BR>&nbsp; <B>Red Shirt</B> &nbsp;&nbsp;</td><TD>&nbsp;<B>134455</B> &nbsp;&nbsp;</td><TD>&nbsp;<B> $22.99</B>&nbsp;&nbsp;</TD> <TD><BR>&nbsp;<B>1</B>&nbsp;&nbsp;</TD></TR><TR> <TD align=right bgColor=whitevAlign=top><BR>&nbsp;<B>New Balance X65 </B>&nbsp;&nbsp;</td><TD>&nbsp;<B>Running Shoe </B>&nbsp;&nbsp;</td><TD>&nbsp;<B>271721</B>&nbsp;&nbsp; </td><TD>&nbsp;<B>$60.99</B>&nbsp;&nbsp;</TD><TD><BR> &nbsp;<B>1</B>&nbsp;&nbsp;</TD></TR>

In the example of Table 3, the parser 24 recognizes the four or more product keywords that exist consecutively. The parser 34 therefore stores this information, which can be done in the form of a table, such as Table 4 below. Each product keyword, in this example, is a column header in Table 4. When the first data string that is not a product keyword is located, "Nike," the parser 24 recognizes that this term is not a product keyword. This term, however, is appended with the following term, "T-shirt", until the "</td>" tag is reached, which indicates the end of a piece of data in the HTML syntax. In this example, the term "Nike T-shirt" is recognized to be a descriptor because it is not a keyword and because it is of the same data type as "Product Name." This descriptor is therefore added to a row in Table 4 underneath "Product Name" for information regarding a first product. Parsing then continues for the first product, and information is placed in the first product row of Table 4, until the end of the product row in Table 4 is reached (along with the </td> tag in Table 3). This indicates the end of a first product data row. The next data string, "New Balance X65" is then recognized as not being a transaction keyword and instead as being of the same data type as Product Name. It is therefore added to storage in a second product data row in Table 4 below. This continues until all of the information for the second, and last, product in Table 3 has been parsed and stored.

TABLE 4

Product Information Table

| Product Name | Description | Item Number | Unit Price | Quantity |
|---|---|---|---|---|
| Nike T-shirt | Red Shirt | 134455 | $22.99 | 1 |
| New Balance X65 | Running Shoe | 271721 | $60.99 | 1 |

Second Embodiment

If the product keywords are not in the form of a table, a different procedure can be followed, as described in the second embodiment that follows. Information is not in the form of a table if a first product keyword is found and the next data string is not recognized as a product keyword. If this is the case, the first product keyword is stored, as indicated by block 110 of FIG. 2. The next data string is checked to determine if it is of the same data type as the first product keyword, as indicated in block 112 of FIG. 2. If it is the same data type, this data string is appended as a descriptor for the first product keyword, as indicated by block 114 of FIG. 2. The next product keyword is then found, and the following data string is checked to determine if it is of the same data type as this next product keyword. If it is, this product keyword and descriptor are stored, as indicated in block 116 of FIG. 2. This process of finding product keywords and associated descriptors is then repeated until the first transaction keyword is found. A fuller description along with an example of parsing keywords and descriptors for information that is not in the form of a table is set forth below for transaction information (rather than product information).

Once a transaction keyword has been found (block 118 of FIG. 2), the system and method continue to look for transaction keywords until a string that is not a transaction keyword is found. If more than one consecutive keyword is found, then a table is present. If two or more consecutive transaction keywords are not found, then a table of transaction information is not present. Block 120 of FIG. 2 depicts this determination of whether a table of transaction information is present or not.

If a transaction data table is present, transaction information is processed in the same way as was product information. In other words, the consecutive transaction keywords will be parsed (block 130 of FIG. 2), and then the descriptors will be parsed. As indicated by block 132 of FIG. 2, the data type of the transaction descriptors can be compared to the corresponding transaction keyword to ensure that the proper data type is present. Block 134 indicates that transaction data is parsed and this process is repeated until the end of the HTML file. In parsing the transaction descriptors, as in the case of product descriptors, the data strings that occur between a right bracket ">" and a left bracket "<" are appended with any data strings occurring between the next set of right ">" and left "<" brackets until the end of a line is reached, as indicated by a "</td>" tag in the HTML syntax and the last column header in a stored table, such as Table 6 below. When the end of a line (a transaction row) is reached, the next string is either the first column of the next transaction data row or the end of the HTML page. Typically, transaction information forms only a single data row, because the transaction information is typically for the entire purchase and is not for a portion of the purchase, such as one product out of five products. After all of the transaction information is parsed, parsing is complete. Therefore, the system and method stops parsing after it reaches the total for the order or after it reaches the end of the file or the "</HTML>" tag.

As an example, the following table, Table 5, shows HTML syntax that represents transaction information that is in the form of a table:

TABLE 5

Transaction Information In Table Form

<TD bgColor=white vAlign=top><BR> <B>Order Subtotal:  </B></TD><TD><BR> <B>Shipping:</B><BR> <B>Sales Tax: </B></TD><TR><TD align=right bgColor=whitevAlign=top> <BR> <B>$53.98</B></TD><TD>  <BR>  <B>+$5.99</B></TD><TD>  <BR> <B> +$0.00</B></TD><TD>  </TD></TR>

In this example, the transaction keywords—Order Subtotal, Shipping, and Sales Tax—appear consecutively in the HTML syntax, with each being between a right bracket ">" and a left bracket "<". These transaction keywords are therefore parsed and, for example, stored in a database such as Table 6 below. The descriptors for each of these transaction keywords then follows in the HTML syntax in the order of the transaction keywords. These descriptors are then stored along with the corresponding transaction keyword. Table 6 below, for instance, shows the complete table with the descriptor for each transaction keyword aligned in the table with a descriptor below it. When parsing these descriptors, the parser 24 could append all of the data on a line, with the end of the line indicated by the </TD> tag.

TABLE 6

Transaction Information Table

| Order Subtotal | Shipping | Sales Tax |
|---|---|---|
| $53.98 | $5.99 | $0.00 |

If more than one consecutive transaction keyword is not found, a table is not present. If a table is not present, then the next piece of data after the first transaction keyword will correspond to a descriptor for that transaction keyword. Block 122 of FIG. 2 represents the first transaction keyword being stored. In block 124, the data type of the next data string is compared to the data type of the first transaction keyword, and if the two data types are the same, this descriptor is appended with the transaction keyword (block 126). This process is then repeated until the end of the HTML file, as indicated by block 128.

As an example, the following table, Table 7, shows HTML syntax that represents transaction information that is not in the form of a table:

TABLE 7

Transaction Information That Is Not In Table Form

<TD ALIGN="RIGHT" BGCOLOR="003366"><FONT COLOR= "FFFFFF" FACE="Arial,Helv" SIZE="2"><B>Product Total:</B><BR> </FONT></TD><TD ALIGN="right" BGCOLOR="003366"> <FONT COLOR="FFFFFF" FACE="Arial,Helv" SIZE="3"><B> $64.98</B></FONT></TD><TD ALIGN="RIGHT" BGCOLOR= "003366"><FONT COLOR="FFFFFF" FACE="Arial,Helv" SIZE="2"> <B>Sales Tax:</B><BR></FONT></TD><TD ALIGN="right"

TABLE 7-continued

Transaction Information That Is Not In Table Form

BGCOLOR="003366"><FONT COLOR="FFFFFF" FACE="Arial, Helv" SIZE="3"><B>$3.25</B></FONT></TD>

In this example, a first transaction keyword, "Product Total," is found by the parser 24 and recognized as a transaction keyword. The next data string that is found is "$64.98," which the parser 24 recognizes as not being a transaction keyword. This data string, therefore, is checked to determine if it is the correct data type for the transaction keyword. Because a number (64.98) is the correct data type for the transaction keyword (Product Total), the descriptor is recognized as corresponding to the transaction keyword. The transaction keyword is then stored along with the descriptor. Table 8 below, for instance, depicts a data table for this example. The next data string after "$64.98" is "Sales Tax:", and this data string is recognized by the parser 24 as being a transaction keyword. The next data string after this transaction keyword is "$3.25," which the parser 24 recognizes as being the correct data type for the transaction keyword "Sales Tax:". This transaction keyword and corresponding descriptor are therefore stored, and a table such as Table 2 below could be produced for this transaction information.

TABLE 8

Transaction Information Table

| Product Total | Sales Tax |
|---|---|
| $64.98 | $3.25 |

Third Embodiment

In the examples of parsing product and transaction information noted above, examples were provided for transaction information and product information in HTML syntax in the form of a table and also for transaction information and product information that was not in the form of a table. It is common for product information to be in table form and for transaction information to be in either table form or not in table form. This is commonly the situation because many products may be purchased in a single transaction, and it is therefore easier in HTML syntax to list the product keywords one time and then to list the descriptors for each product in succession, as described above. If product information is not in the form of a table, however, the method and system parse the product information as described above based on product keywords and matching of data types.

In one embodiment, certain checking of data is performed when parsing takes place to determine if the data is accurate. For instance, if one keyword type is "Total Price," the "Unit Price" for an item can be multiplied by the "Quantity" to determine "Total Price" is correct. The value of the descriptor for "Unit Price," absent the dollar sign, can be multiplied as a real number by value of the descriptor for the "Quantity." The integrity of the parser 24 can therefore be dynamically checked to determine the accuracy of parsed purchase information.

In another embodiment, product keywords can be contained in images instead of text. In such an embodiment, keyword searching for product keywords will not be effective. Instead, a different approach can be used. In this approach, the "<TR>" tags are checked to determine if a row is present (a row is indicated by a "<TR>" tag in HTML). The first row is therefore found, and each data string in the row (between a "<TR>" tag and a "</TR>" tag) is checked to determine its data type. The typical layout of Web pages can then be assumed to attempt to construct the table of data. After the "</TR>" tag indicates the end of a row, a new "<TR>" tag indicates the presence of another row of data. Based on the common layouts of confirmation and check-out pages, it can be assumed that a row of data (set off by a "<TR>" tag) is product data if certain requirements are met. These requirements are based on the common layout of a row of product data. The data strings in a row are therefore checked against the requirements for product data and, if the requirements are met, the row of data is saved in table form as a row of product data.

The requirements for a row of product data follow. The typical keyword types that exist for a row of product data are: Product Name, Product Description, Item Number, Quantity, Unit Price, and Total Product Price. The descriptor for the "Product Name" of the product is typically the first data string in the row of product data. The first data string can therefore be assumed to be the product name and can be stored as the product name. The second data string is commonly the "Product Description," and hence this data string can be stored as the product description. Data strings existing after the descriptor for "Product Description" in a row are initially classified as being "other" type data strings. If there are more than four data strings, including the product name and product description, before a data string that appears to be the quantity or a price, then a data table is not present and a different method of parsing can be used.

A data string that is a quantity, or the number of products purchased, is typically the first integer that is less than 99 in value. The first such integer that is less than 99 in a row of data can therefore be assumed to be the quantity. The first data string that is greater than 99 is typically the item number, and can therefore be assumed to be the item number. The first price, as indicated by a data string that contains a "$", is typically the unit price, and can be assumed to be the unit price. The next price after unit price, as indicated by a data string that contains a "$", can, possibly, be the total product price. To determine if this data string is the total product price, this next data string is checked to see if it is equal to the quantity multiplied by the unit price. If it is, then this price is assumed to be the total product price. Again, as stated earlier, if more than four data strings are present before the quantity or a price is found, this method will not be used and it will be assumed that a table of product data is not present. If, however, the row of data meets the requirements for the quantity, item number, unit price, and total product price, and fits within the framework described above, the row of data will be saved as product data.

The process described above for product data that is in table form but is not set off by product keywords can be repeated for each data row (using the "TR>" and "</TR>" tags) to parse product information. When the first transaction keyword is found, parsing of product information ceases and one of the methods described above for parsing transaction information is used.

Fourth Embodiment

In a fourth embodiment that can differ from those described above, the method and system parse strings of text and check to determine if each string fits into one of the types of product information or if it is a transaction keyword. If a string is not a transaction keyword or a data string related to a transaction keyword, it is treated as a potential piece of product information. In this embodiment, product keywords are not used in parsing. For example, product keywords such as "product name" and "unit price" are not used in parsing product information. Instead, data strings occurring before specific transaction keywords are found are treated as potential pieces of product information (that is, descriptors for product information), and information about the data strings are examined to determine what type of information the data strings represent. This embodiment can have benefits over the embodiments described above because it requires less specific knowledge about the layout of a transaction Web page. This embodiment, for instance, does not use specific product keywords in parsing product information. At the same time, this embodiment uses more information about the general structure of product information, and this makes it, in some instances, more robust and compact than the other embodiments described above.

If a data string might be a descriptor for product information, the method and system determines if the data string contains a monetary amount. To determine if a monetary amount is present, the data string is checked for a dollar sign ("$") and for a decimal point ("."). Although a dollar sign ($) is typically present, it is not always included in a monetary amount. If, however, a dollar sign ($) is present, the data string is determined to be a monetary amount. If a floating point value with a decimal point (.) is found without a dollar sign ($), it is still considered to be a potential monetary amount. If a decimal point (.) is present and a floating point value is found, the data string is checked to determine if two decimal places are present after the decimal point (.). If two decimal points are present in a floating point value after a decimal point (.), the data string is considered to be a monetary amount.

After a monetary amount is found, a determination is made as to what type of price has been found. Generally, a price for product information can be one of the following types of prices: unit price, total price, or comparative price. A "unit price" is the price for a single unit of the product. A "total price" is the unit price multiplied by the number of the products purchased. A "comparative price" is the price for a similar product by a different manufacturer of the like.

The first price that is found is assumed to be the unit price unless other information is found to confirm or contradict this assumption. If a quantity (that is, the number of units of that product to be purchased) is known when the first price is found, then the subtotal is assumed to be the first price multiplied by the quantity. If no further pricing information is found, then the first price is assumed to be the unit price and the calculated subtotal will be used as the actual subtotal. A method for determining the quantity is described below.

The second price that is found is assumed to be a comparative price unless one of two assumptions hold. If the second price is equal to the first price multiplied by the quantity, then the second price is the total price and the first price is the unit price. If the first price is equal to the quantity multiplied by the second price, then the second price is the unit price and the first price is the total price. If neither of these conditions applies, then the lesser of the two prices is assumed to be the unit price and the greater of the two prices is assumed to be the comparative price. These assumptions apply unless a third price is found as described below.

Another set of assumptions applies if a third price is found. If the third price is equal to the second price multiplied by the quantity, then the second price is the unit price, the third price is the total price, and the first price is the comparative price. If the third price is equal to the first price multiplied by the quantity, then the first price is the unit price, the third price is the total price, and the second price is the comparative price. If neither of these conditions is met, then the third priced is ignored. Generally, if one of the conditions above does not apply, the third priced is an unnecessary piece of information.

The quantity of the product has been mentioned above in the discussion of how to determine which prices belong to different types of prices. In order to determine which data string or number is the quantity, certain tests can be performed. Generally, the quantity is expressed as an integer. There are, however, other types of product information that can also be integer values, such as the product size and an item code. Generally, a quantity has four digits or less, and an item code has nine digits or more. A quantity is therefore relatively easily distinguished from an item code. The size of a product, however, can have a similar number of digits as the quantity. Generally, therefore, the first integer can be assumed to be the quantity and the second integer can be assumed to be the size, and then these assumptions can be tested with pricing information. If the assumption of the first integer of the quantity results in pricing information that makes sense (that is, the quantity multiplied by the unit price equals the total price), then the first integer is the quantity. Similarly, if the second integer as the quantity results in pricing information that makes sense, then the second integer is the quantity rather than the first integer. Whichever of the first integer or the second integer does not make sense with the pricing information is assumed to be the product size.

Aside from prices, item codes, quantities, and sizes, non-numeric strings can also be dealt with in parsing product information. In this embodiment, the first non-numeric string is initially assumed to be the product name. The second non-numeric string is initially assumed to be the product description. If there is a third non-numeric string, then the first and second non-numeric strings are checked to determine if either string is too short to be informative. In one embodiment, a product name and a product description are over three characters in length. In this embodiment, therefore, if either of the first string or the second string are three characters or less in length, then the third string replaces the string that is not long enough. As an example, if the first string is five characters, the second string is three characters, and the third string is six characters, then the third string will replace the second string as the product description. If both of the first and second strings are three characters or less, then the third string replaces the first string as the product name.

Product information (that is, the descriptors for product information) for one product can be parsed from an HTML page and inserted into a table, spreadsheet, or other format in a file so that the type of product information is readily discernable. For instance, parsed product information for two different products could appear in the form of Table 4 in a file. After a complete set of product information has been found for a given product, information regarding the next product purchased can be searched for and parsed. Generally, the end of a complete set of product information is indicated by the presence of a total price for the product. In some embodiments, however, the end of product information for one product (or the end of one row of product information) is indicated by the detection of the product name, quantity, and total price. In this embodiment, all other product information for the product, such as the product description and comparative price, occur in between the product name, quantity, and total price. For example, the description for a product typically occurs after the product name, but before the total price. In addition, the comparative price typically occurs before the total price. Because the comparative price and description are surrounded by two or more of the product name, quantity, and total price, the end of product information for one product can be assumed by the detection of the product name, quantity, and total price. In situations where the total price is not found, but is instead calculated as the quantity multiplied by the unit price, the detection of the product name, quantity, and total price still indicates the end of product information for one product because the total price can be calculated only after the unit price and quantity have been found.

After a complete set of information for one product has been found, product information for the next product can be found using the same method described above. In other words, variables for the first price, second price, and so forth are reset and searching begins for the next product. Products are therefore found as indicated above and product information can be parsed for each such product. This process of finding and parsing product information is continued until a transaction keyword that indicates the presence of a subtotal for the entire purchase is found. In this embodiment, when such a subtotal is found, parsing of product information is complete and transaction information can then be parsed. In some embodiments, some types of transaction keywords, such as the credit card type and shipping information, can occur before product information or in other locations in a Web page. The subtotal for the entire purchase, on the other hand, typically occurs after all of the product information, and the subtotal is typically the first transaction keyword to appear after the product information. For these reasons, the detection of the subtotal for the entire purchase can be used to determine the end of product information and the beginning of transaction information.

To parse transaction information in this embodiment, the system and method search for transaction keywords and keep track of how many such transaction keywords are found in a row. If four or more transaction keywords in a row are found, then transaction information arranged in a table has been found. If four or more transaction keywords in a row are found, then the first data string that is not a transaction keyword is the first piece of data for the first row of transaction data, the second data string is the second piece of data for the first row of transaction data, and so forth. This process is repeated until all of the transaction information has been parsed. All of the transaction information has been parsed when either a transaction total or a data string that does not match its column type (that is keyword type) has been found. Table 5 shows transaction information that is in table form.

If not enough transaction keywords in a row are found, then the transaction information is not in the form of a table. In such a case, the data string immediately after each transaction keyword is assumed to be the value for that keyword, and such data strings are parsed into appropriate locations as such. Table 7 shows transaction information that is not in table form.

Generally, there are two types of transaction keywords: prices and types. The transaction prices are the subtotal, tax, discounts, shipping, and total. The transaction types are credit card type and shipping type. To find the keywords for the transaction prices, substring matches can be used. This keeps the number of transaction keywords somewhat small. For example, the keyword "total" can be used to search for both the subtotal and the total for the transaction. Because the subtotal typically is the first piece of information in the transaction section, the subtotal can be distinguished from the total by assuming that the first data string having "total" is the subtotal. An exact match between the keyword for a transaction price and a data string is therefore not always needed.

For transaction types, an exact match between a keyword and a data string is typically required to find the descriptive words for the transaction type. For example, a transaction involving an American Express card would be detected if there was a data string that matches one of the following keywords: "American Express," "AMEX," and "AX." Unlike transaction prices, which typically occur only after product information, transaction types can occur at any location on a page.

In this embodiment of the invention, two types of transaction keyword files can be used. The first file, which can be used for transaction price keywords, can contain keyword strings followed by a number representing the keyword type. For example, "tax" keywords can be type 12, so that an entry in the first file could be: "Tax 12." The second file, which can be for transaction type keywords, can be slightly different. Each line in the second file contains a keyword string followed by a descriptor and then a number. The description can be used to provide consistency between keywords that are the same type. For instance, "American Express" can be written in one string in this file, followed by the descriptor "AMEX," and then followed by the keyword type "17."

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. A method for parsing purchase information from code of a Web page for a purchase, comprising:
   performing when a sufficient number of product keywords are present to represent a table of product information, the steps of:
   parsing the product keywords end placing the product keywords as headings for a table of product information;
   parsing and pasting descriptive information for each product in a row under the headings in the table of product information after checking data types to ensure that each descriptor fits with the product keyword;
   detecting at least one known transaction keyword and at least one transaction data string following that transaction keyword and being associated with that transaction keyword, the transaction data string being a descriptor for the transaction keyword; and
   copying and placing the purchase information into an organized form.

2. The method of claim 1, wherein a first data string that is not a product keyword will be a fitst piece of descriptive information for the product row.

3. The method of claim 1, wherein an end of the row for each product is determined by identifying an indicator in the code.

4. The method of claim 1, wherein the product keywords are product keywords matched from a plurality of product keywords of a common keyword type.

5. The method of claim 4, wherein the keyword types include one or more of a product name, product description, item number, unit price, quantity, and total price.

6. The method of claim 1, wherein the transaction keywords are organized into groups of transaction keywords of common transaction keyword types.

7. The method of claim 6, wherein the common transaction keyword types include one or more of a product total, subtotal, tax, discount, total, shipping type, shipping cost, and credit card type.

8. The method of claim 1, wherein detecting at least one known transaction keyword includes:
   performing when a sufficient number of transaction keywords are present to represent a table of transaction information, the steps of:
   parsing the transaction keywords and placing the transaction keywords as headings for a table of transaction information; and parsing descriptive information for each product in a row under the headings in the table of transaction information after checking data types to ensure that each descriptor fits with the transaction keyword.

9. A method for parsing purchase information from code of a Web page for a purchase, comprising:
   detecting at least one known product keyword and at least one product data string following hat product keyword and being associated with that product keyword, the product data string being a descriptor for the product keyword for one product in the purchase;
   performing when a sufficient number of transaction keywords are present to represent a table of transaction information, the steps of:
   parsing the transaction keywords and placing the transaction keywords as headings for a table of transaction information;
   parsing descriptive information in a row under the headings in the table of transaction information after checking data types to ensure that each descriptor is an appropriate data type for the transaction keyword; and
   copying and placing the purchase information into an organized form.

10. The method of claim 9, wherein the known product keyword is one product keyword matched from a plurality of product keywords of a common keyword type.

11. The method of claim 10, wherein the keyword types include one or more of a product name, product description, item number, unit price, quantity, and total price.

12. The method of claim 9, wherein the transaction keywords are organized into groups of transaction keywords of common transaction keyword types.

13. The method of claim 12, wherein the common transaction keyword types include one or more of a product total, subtotal, tax, discount, total, shipping type, shipping cost, and credit card type.

14. The method of claim 9, further comprising checking each product data string to determine it the product data string is an appropriate data type for the associated product keyword.

15. A method for parsing purchase information from code of a Web page for a purchase, comprising:
   locating product information for each product purchased by reviewing data string occurring before a first transaction keyword;
   locating product information for each product including:
   performing when each data string is pricing information, the steps of:
   (a) determinig which type of pricing information is present;

determining a quanity for the product;

(b) determining non-numeric information for the product, the non-numeric information including at least the product name; and (c) determining an end of the product information for each product;

locating transaction information for the purchase by searching for transaction keywords from the data string; and copying and placing the located product information and transaction information into an organized form, wherein determining which type of pricing information is present includes: initially assuming that a first price found is the unit price; initially assuming that a second price found is the comparative price unless: the second price equals the first price multiplied by a quantity of the product, in which case the second price is the total price and the first price is the unit price; or the first price is equal to the second price multiplied by the quantity of the product, in which case the second price is the unit price and the first price is the total price; and if a third price is found, then the third price is the total price if: the third price is equal to the second price multiplied by the quantity, in which case the second price is the unit price; or the third price is equal to tile first price multiplied by the quantity; in which case the first price is the unit price.

16. A method for parsing purchase information from code of a Web page for a purchase, comprising:

locating product information for each product purchased by reviewing data strings occurring before a first transaction keyword;

locating product information for each product including:

performing when each data string is pricing information, the steps of:

(a) determining which type of pricing information is present;

determining a quantity for the product;

(b) determining non-numeric information for the product, the non-numeric information including at least the product name; and (c) determining an end of the product information for each product;

locating transaction information for the purchase by searching for transaction keywords from the data strings; and copying and placing the located product information and transaction information into an organized form, wherein the non-numeric information includes one or more of the product name and product description, and wherein determining non-numeric information for the product includes; initially assuming that a first non-numeric data string is the product name; initially assuming that a second non-numeric data string is the product description; and if a third non-numeric data string is present and if one of the first non-numeric data string and the second non-numeric data string is too short to be informative, replacing the first non-numeric data string or the second non-numeric data string with the third non-numeric string as the product name or product description.

* * * * *

UNITED STATES PATENT AND TRADEMARK OFFICE
CERTIFICATE OF CORRECTION

PATENT NO. : 7,222,090 B2
APPLICATION NO. : 10/136537
DATED : May 22, 2007
INVENTOR(S) : Anthony Scott Oddo It is certified that error appears in the above-identified patent and that said Letters Patent is hereby corrected as shown below:

On the Title Page, Item -56-, Page 2, "Other Publications," first line, change "Inforamtion" to --information--.
Column 1, line 62, delete "Least" and insert instead --least--;
Column 5, line 59, delete ""<1>"" And insert instead --"<I>"--.
Column 8, line 23 (approx) delete "a In" and insert instead --a "$". In--.
Column 17, line 42 (approx), in claim 1, delete "end" and insert instead --and--; line 57, delete "fitst" and insert instead --first--.
Column 18, line 24 (approx), in claim 9, delete "hat" and insert instead --that--; line 55 (approx), in claim 14, after "determine" delete "it" and insert instead --if--.; line 61, in claim 15, delete "string" and insert instead --strings--; line 66, in claim 15, delete "determinig" and insert instead --determining--.
Column 19, line 1, in claim 15, delete "quanity" and insert instead --quantity--; line 9, in claim 15, delete "string;" and insert instead --strings;--; line 25, delete "tile" and insert instead --the--.
Column 20, line 21, in claim 16, delete "includes;" and insert instead --includes:--.

Signed and Sealed this

Twenty-first Day of August, 2007

JON W. DUDAS
*Director of the United States Patent and Trademark Office*